United States Patent Office 2,978,436
Patented Apr. 4, 1961

2,978,436

CYCLIC POLYMER AND METHOD OF PREPARATION

John F. Jones, Cuyahoga Falls, Ohio, assignor to The B. F. Goodrich Company, New York, N.Y., a corporation of New York No Drawing. Filed Apr. 18, 1957, Ser. No. 653,519

21 Claims. (Cl. 260—63)

This invention relates to polymeric diacrylyl methanes or polymeric polymethylene dihydro resorcinols and to the methods of their preparation and more particularly pertains to polymers having recurring.

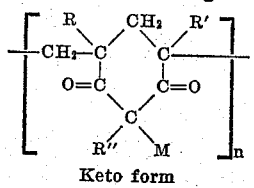

Keto form or

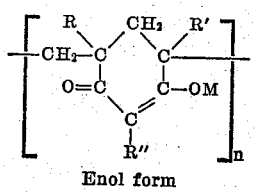

Enol form units in the polymer chain and to methods for preparation of the polymeric materials by the condensation of a vinyl ketone and an ester of an acrylic acid in the presence of an alkaline condensation agent. The vinyl ketones generally conform to the formula

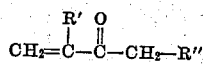

in which R' represents hydrogen and a lower alkyl group, a cyclo-aliphatic saturated hydrocarbon group and a phenyl group and R" is hydrogen and lower n-alkyl group of from 1 to about 5 carbon atoms and the acrylic acid esters generally conform to the formula

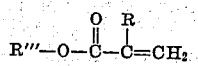

in which R''' is hydrocarbon residue of the monohydric alcohol moiety of the ester and preferably an alkyl group, a cycloalkyl group or a phenyl group and R represents hydrogen and hydrocarbon groups of from 1 to 6 carbon atoms having no aliphatic unsaturation. The above designations for R, R' and R" also apply to the polymer, and M represents ionic hydrogen and a salt group such as ammonia, or any metal ion and preferably an inorganic monovalent cation such as alkali metal or ammonia, and $n$ is an integer greater than 1.

The polymers function as dyes. Thus, wool cloth was dyed by dipping into a 2% solution of polydiacrylyl methane or polymethylene dihydro resorcinol

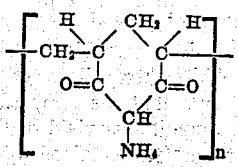

or

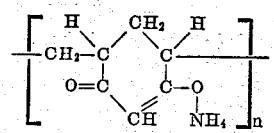

in concentrated ammonium hydroxide. The treated wool was allowed to dry and then dipped into dilute acetic acid solution to convert the polymeric salt to acid. The wool was colored yellow to yellow-orange and was fast to repeated washings with soap and water. Cotton when treated in the same manner also was colored yellow, but the dye was not as fast on the cotton as on wool. All the polymers of this invention will dye wool and cotton a yellow or yellow-orange color.

The method for preparing the polymers preferably involves the reaction of substantially equimolar proportions of the ester of an acrylic acid of the structure

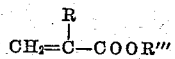

in which R and R''' have the same designation as above, with a vinyl ketone of the structure

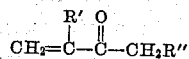

in which R' and R" have the same designation as above, in the presence of about one mole of alkaline condensation agent and preferably in the presence of an inert diluent at a temperature between about 100° C. and −100° C. and preferably between about −10° C. and 25° C. The order of addition of ingredients is important. Thus, the vinyl ketone and alkaline condensation catalyst should not be blended in the absence of acrylate ester. The vinyl ketone can be added to a mixture of the acrylic acid ester and an alkaline condensation agent or a mixture of vinyl ketone and acrylate ester can be added to the alkaline condensing agent. Proportions of acrylate ester or vinyl ketone other than equimolar can be used at the expense of yield of the desired polymer.

Among the acrylic esters that are suitable are the alkyl, cycloalkyl and aryl esters of acrylic acid and a lower alpha-alkyl, aryl or cycloalkyl acrylic acid. Specifically, these include but are not limited to compounds such as methyl acrylate, ethyl acrylate, n-propyl acrylate, iso-propyl acrylate, the butyl acrylates, the amyl acrylates, the hexyl acrylates, the heptyl acrylates and the octyl acrylates, cyclohexyl acrylate, methyl cyclohexyl acrylates, and lower alkyl substituted cyclohexyl acrylates, phenyl acrylate, tolyl acrylate, xylyl acrylate, naphthyl acrylates and other esters of acrylic acid and a mono- or polycyclic monophenol. The acid moiety of the acrylic ester can be an alpha-alkyl, cycloalkyl or aryl substituted acrylic acid such as methacrylic acid, ethacrylic acid, alpha-propyl acrylic or alphabutyl acrylic acid, alpha-pentyl acrylic acid or an alpha-hexyl or cyclohexyl acrylic acid or it can be an alpha-aryl substituted acrylic acid such as alpha-phenyl acrylic acid. The ease with which the polymerization occurs is generally directly related to the ease of alkaline hydrolysis of the acrylic ester. For this reason the preferred esters are the lower alkyl esters, i.e., methyl or ethyl esters of acrylic acid or methacrylic acid. All these esters conform to the general formula

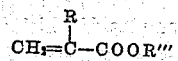

in which R is hydrogn and a hydrocarbon group of from about 1 to 10 carbon atoms and free of aliphatic unsaturation and preferably R is hydrogen and a hydrocarbon group having from 1 to 6 carbon atoms and contains no aliphatic unsaturation.

The vinyl ketones, which conform to the general formula

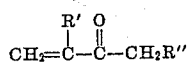

include compounds in which R' is hydrogen or hydrocarbon group having from 1 to 6 carbon atoms, having no aliphatic unsaturation and R'' is a lower n-alkyl group of from 1 to about 5 carbon atoms. Representative ketones are those in which the R' is methyl, ethyl, a propyl, a butyl, a pentyl, a hexyl, a cyclohexyl or a phenyl group, and R'' is hydrogen or n-lower alkyl group such as methyl, ethyl, n-propyl, n-butyl and n-pentyl.

In order for the polymerizaion to proceed it is essential to use an alkaline condensation agent of the type used in the Claisen condensation reaction. Representative condensing agents are alkali metals, which include lithium, sodium, potassium and cesium, alkali metal hydrides, amides, alkoxides, especially those of lower alkanols having from 1 to 6 carbon atoms. Of these condensing agents sodium methoxide, sodium ethoxide, sodium propoxides, potassium methoxide, potassium ethoxide and potassium propoxides are preferred and especially preferred are the sodium methoxides, ethoxides and propoxides because of their ease of preparation and relatively high activity.

In order to obtain maximum yields of polymer equimolar proportions of an acrylic ester, a vinyl ketone and condensing agent are reacted. However, the reaction will also proceed with proportions other than equimolar quantities of each ingredient, but the yield will suffer and there is a tendency towards increasing the rate of undesirable side reactions. However, when an alkali metal amide is employed as the condensing agent it is preferred to use an excess of the ester because of the tendency toward formation of an acid amide from a side reaction between the ester and the condensing agent.

The temperature at which the reaction will occur can vary over a fairly wide range and depends in part on the reactivity of the acrylic ester, on the reactivity of the vinyl ketone and on the activity of the condensing agent. Thus, when acrylic esters which are difficult to hydrolyze, such as the higher molecular weight esters of acrylic acid or the alpha-substituted acrylic acid esters with a substituent of higher carbon content, or higher molecular weight vinyl ketones are employed, or if higher molecular weight alkali metal alkoxides are used as condensation agents, a comparatively high reaction temperature, in the neighborhood of 10 to about 100° C. is needed. On the other hand, when a lower acrylic ester, for example, methyl acrylate, ethyl acrylate, methyl methacrylate or ethyl methacrylate is condensed with a low molecular weight vinyl ketone such as methyl vinyl ketone or methyl isopropenyl ketone in the presence of a lower alkali metal alkoxide, such as sodium methoxide or sodium ethoxide, the reaction will proceed at temperatures between about −100° C. to about 25° C., and preferably between about −10° C. and 25° C.

It is preferable, but not necessary, to carry out the polymerization in a diluent which is inert toward the acrylate ester, the vinyl ketone and the alkaline condensing agent. The presence of a diluent aids in removal of the heat generated in the exothermic reactions. Exemplary diluents include aromatic liquid hydrocarbons, of which benzene, toluene, xylenes and liquid nuclear halogenated derivatives of the aromatic hydrocarbons, aliphatic hydrocarbons which will not polymerize anionically, representative examples of which include propane, butanes, pentanes, hexanes, heptanes, octanes, nonanes, decanes, dodecanes, monoolefinically unsaturated aliphatic hydrocarbons such as isobutylene, propene, hexene-2, hexene-3, heptene-2, heptene-3, heptene-4 and other monoolefinically unsaturated hydrocarbons having from 4 to 12 carbon atoms; cycloaliphatic hydrocarbons exemplified by cyclohexane, cyclohexene, cyclopentane, cyclopentene, cyclobutane, cyclobutene and lower alkyl substituted derivatives of the cycloaliphatic hydrocarbons in which the alkyl group has from 1 to 4 carbon atoms, liquid aliphatic and cycloaliphatic ethers such as dimethyl ether, diethyl ether, methyl etheyl ether, dipropyl ether, diisopropyl ether, dibutyl ethers, and mixed lower alkyl ethers and mixtures thereof, furan, tetrahydrofuran, pyran, dioxanes and the like.

The examples which follow are exemplary only and are intended to be illustrative but not limitations on the invention. The parts are by weight unless specifically stated otherwise.

*Example I*

A solution of 71.5 parts of ethyl acrylate and 500 ml. toluene was prepared in a 1 liter 3-necked flask, equipped with a thermometer, a dropping funnel, a mechanical stirrer and a water cooled condenser having a calcium chloride drying tube attached to its end. The solution was cooled to 0° C. and 36.8 parts of sodium methylate were added slowly to the solution of ethyl acrylate, and the slurry was cooled to 0° C. Thereafter a solution of 50 parts of methyl vinyl ketone in 100 ml. toluene was added over a period of two hours, with continuous stirring for an additional three hours. The temperature of the reaction mixture was maintained at 0° C. during the entire period. The reaction mixture was then permitted to come to room temperature slowly. The reaction product was present as a dark brown suspension. Ice water in a volume equal to that of the reaction mixture was added, and the aqueous layer was separated and washed with fresh ether. The sodium salt of the polymer was soluble in water. To obtain the free acid, the aqueous solution oft he polymeric methylene dihydro resorcinol was acidified with 46.5 ml. of glacial acetic acid. The polymeric diacrylyl methane or polymethylene dihydro resorcinol was recovered by filtration and dried at 50° C. in a vacuum oven. In this manner 54 parts of dry polymer were obtained.

The dry polymer was a brilliant yellow powder which was soluble in 5% aqueous NaOH, dilute ammonia, dilute sodium carbonate solution (with evolution of $CO_2$) ethanol, acetone and dioxane. The acid form of the polymer is insoluble in water, ethyl ether and benzene.

The acid form of polydiacrylyl methane does not form a complex with ferric chloride. The polymer forms a red phenyl hydrazone in alcohol in two hours at room temperature. A .002% solution of the polymer in ethanol shows a strong ultra-violet absorption peak, at 253 mu. Cyclohexanedione-1,3 has a strong ultra-violet absorption peak at 255 mu.

A film made by evaporating an ethanol solution of the polymer shows a strong absorption peak at 3 microns indicating the presence of OH groups. By standard enol titration, the polymer was found to contain 47% enol. On the basis of these data it is believed that the polymer is a resonance hybrid mixture of enol and keto forms described hereinabove.

On fusing the polymer under 2000 pounds per square inch pressure at 80–110° C. between stainless steel sheets and cooling the sheets become firmly bonded.

*Example II*

The equipment was the same as that described in Example I. A slurry of 143 parts ethyl acrylate, 77.2 parts of sodium methylate in 400 ml. toluene was cooled to −80° C. To this cooled slurry were slowly added 100 parts of methyl vinyl ketone in 100 ml. toluene and the mixture was held at this temperature for an additional hour. The reaction mixture at −80° C. was cobalt blue in color. On removing the refrigerant, the reaction mixture changed to a white, then yellow and finally to a brown color during the time that the temperature increased to about 25° C. A quantitative yield of the sodium salt of polydiacrylyl methane was obtained by filtering the mixture and washing thoroughly with anhydrous ethyl ether.

Example III

The proportions of reaction ingredients of Example II were employed in this example, in dioxane as a diluent. The reaction temperature was 0° C. The polymeric salt is either partially soluble in or swollen by the dioxane. At the end of the reaction period the reaction mixture was a dark viscous liquid. The mixture was added to a large excess of water containing an amount of acetic acid slightly in excess of that needed to neutralize the polymer. A yellow precipitate was isolated by filtration. This was washed with water to remove the dioxane and then the polymer was dried at 40° C. over $CaCl_2$ in a vacuum oven.

Example IV

A slurry of 119 parts of ethyl acrylate, 64 parts of sodium methylate and 400 ml. of ethyl ether was prepared at −80° C. A solution of 83 parts of methyl vinyl ketone in 100 ml. ethyl ether was added slowly to the slurry. The mixture was held at −80° C., an additional hour. The reaction mixture was cobalt blue. The temperature of the mixture was permitted to rise slowly to room temperature and the polymer started to form as the temperature increased. The sodium salt of the polymer was recovered by filtration. After washing several times with anhydrous ethyl ether, the polymer was dried. The yield was quantitative.

Example V

Example IV was repeated but hexane was employed as a diluent in place of diethyl ether. A 95% yield of the sodium salt of the polymer was recovered.

Example VI

Five parts of sodium methoxide were placed in a reaction flask and cooled to −80° C. with stirring. A mixture of 28 parts methyl vinyl ketone and 40 parts ethyl acrylate were added slowly from a dropping funnel over a four hour period. Seventeen parts of sodium methoxide were then added slowly to the reaction mixture which was stirred and maintained at −80° C. At this point the slurry was cobalt blue and fluid. As the mixture was allowed to come to room temperature it darkened and became increasingly viscous finally stopping the stirrer. The dark brown polymeric salt was soluble in water and the acid form could be precipitated with acetic acid. A quantitative yield of dry sodio-polydiacrylyl methane was obtained.

Example VII

Polydimethacrylyl methane was prepared by making a slurry of 59.9 parts of methyl methacrylate, 32.2 parts of sodium methoxide and 400 ml. of toluene cooling to 0° C. and maintaining the temperature and slowly adding a solution of 50 parts methyl isopropenyl ketone in 100 ml. of toluene which was not pre-cooled. After the ingredients were blended the mixture was stirred at 0° C. for an additional 2 hours. The temperature was permitted to rise gradually to room temperature. The slurry contained a brown solid. An equal volume of water was added to the slurry and the organic and aqueous layers were separated. The aqueous layer was acidified with sufficient acetic acid to neutralize the polymer and provide a slight excess of acid. The polymer settled as a fine yellow-brown suspension. The polymer was recovered by filtration and dried. The sodium salt is soluble in water in which it forms a yellow-brown solution.

Example VIII

Example VII was repeated but anhydrous ethyl ether was used as a diluent in place of toluene. At 0° C. the slurry was greenish in color which turned yellow-brown as the temperature increased slowly to that of the room. 67 parts of dry acid form of the polymer were recovered.

Example IX

Polyacrylyl-methacrylyl methane was prepared by making a slurry 59.8 parts of ethyl acrylate and 32.2 parts of sodium methoxide in 400 ml. of toluene. The slurry was cooled to 0° C. and maintained at that temperature throughout the reaction period. A solution of 50 parts methyl isopropenyl ketone in 100 ml. of toluene was added to the stirred slurry over a period of two hours. Immediately after the addition of the methyl isopropenyl ketone cooling of the reaction mixture was stopped and the mixture was permitted to come to room temperature slowly. An equal volume of water was added to the reaction mixture. The aqueous layer was separated and acidified with 68.8 ml. of glacial acetic acid. 33 parts of yellow-brown, dry, acid form polymer were recovered.

The polymers of this invention couple with diazonium salts (of which benzene diazonium chloride is a specific example) to form polymeric azo derivatives which also have good dyeing properties.

Although I have described the method of preparing the polymeric diacrylylmethane in the specific examples in which sodium and potassium alkoxides are used as condensing agents, it is to be understood that other alkali metal alkoxides will also function in this capacity. Thus lithium or cesium alkoxides of lower aliphatic alcohols, especially the alkanols of from 1 to 6 carbon atoms can be substituted in molar proportions for the sodium and potassium alkoxides. Also, mixtures of the alkali metal alkoxides can be employed as condensing agents.

In place of methyl or ethyl acrylate or methyl methacrylate, other esters of acrylic or an alpha-substituted acrylic acid, as mentioned hereinabove can be substituted in equivalent proportions. Also, mixtures of acrylic esters or acrylic and alpha-substituted acrylic esters can be used to prepare polymeric materials containing a plurality of

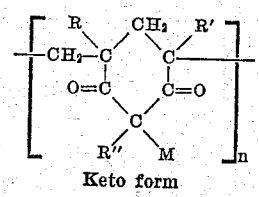

Keto form or

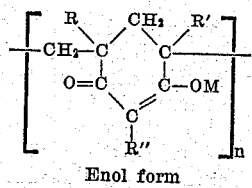

Enol form units where R is H, lower alkyl, a cycloalphatic or a phenyl group. Thus, polymers containing one or more of these groups in the same polymer chain can be prepared by this process.

It is believed obvious that the keto and enol structures are tautomeric forms or resonance hybrids of the same polymeric material and by the recitation of one form in the claims it is intended to include the other tautomer also.

The polymeric diacrylyl methanes or polymeric polymethylene dihydro resorcinols made by the methods described usually have a minimum molecular weight of about 1000, as determined by the Rast method, but polymers of much higher molecular weight are normally obtained by the procedure.

In place of the lower alkyl vinyl ketones or isopropenyl ketones of the specific examples other alkyl vinyl ketones, as described above, can be used.

From the above description of the invention it is apparent that numerous modifications in the ingredients, their proportions and the reaction conditions are possible.

I claim:
1. A polymer having a molecular weight of at least 1000 composed of a series of adjacent, connected recurring units of the structure

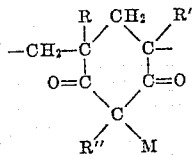

in which R is selected from the class consisting of hydrogen and hydrocarbon groups of from 1 to 6 carbon atoms free of aliphatic unsaturation, R' is selected from the class consisting of hydrogen, lower alkyl groups, saturated cycloaliphatic hydrocarbon groups and a phenyl group, and R" is selected from the class consisting of hydrogen and a lower n-alkyl group and M is selected from the class consisting of hydrogen and monovalent inorganic cations.

2. The polymer of claim 1 in which R and R" each is hydrogen.

3. The polymer of claim 1 in which R and R' are both hydrogen and R" is an n- lower alkyl group.

4. The polymer of claim 1 in which R and R" is each a n- lower alkyl group and R' is hydrogen.

5. The polymer of claim 1 in which R is a lower alkyl group and R" is hydrogen.

6. The polymer of claim 1 in which R is a cyclic hydrocarbon group of 6 carbon atoms and free of aliphatic unsaturation and R" is a lower n-alkyl group.

7. A polymer having a molecular weight of at least 1000 composed of a series of adjacent connected recurring units of the structure

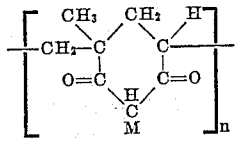

in which M is a monovalent inorganic cation.

8. A polymer having a molecular weight of at least 1000 composed of a series of adjacent connected recurring units of the structure

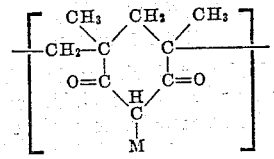

in which M is a monovalent inorganic cation.

9. A polymer having a molecular weight of at least 1000 composed of a series of adjacent connected recurring units of the structure

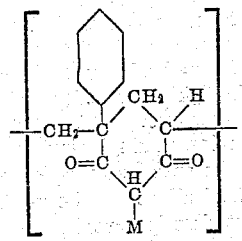

in which M is a monovalent inorganic cation.

10. A method for preparing a polymer having a molecular weight of at least 1000 composed of a series of adjacent, connected recurring units of the structure

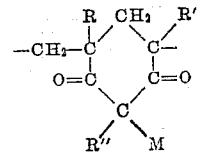

in which R is selected from the class consisting of hydrogen and hydrocarbon groups of from 1 to 6 carbon atoms free of aliphatic unsaturation, R' is selected from the class consisting of hydrogen, lower alkyl groups, saturated cycloaliphatic hydrocarbon groups and a phenyl group, and R" is selected from the class consisting of hydrogen and lower n-alkyl groups, comprising reacting a compound of the structure

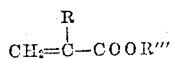

in which R has the same designation as above and R'" represents the hydrocarbon residue of an alcohol free of aliphatic unsaturation with a compound of the structure

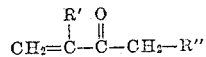

in which R and R' each has the same designation as above, in the presence of a Claisen condensation agent under substantially anhydrous conditions at a temperature above the solidification point of the mixture and not substantially above 25° C.

11. The method of claim 10 in which the temperature ranges between about −80° C. and 0° C.

12. The method of claim 10 in which the Claisen condensation agent is an alkali metal alkoxide.

13. The method of claim 10 in which the reaction is carried out in the presence of an inert diluent.

14. The method of claim 10 in which the compound having the structure

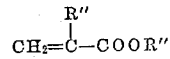

is a lower alkyl ester of acrylic acid.

15. The method of claim 10 in which the compound having the structure

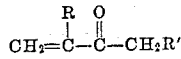

is methyl vinyl ketone.

16. The method of claim 10 in which the compound having the structure

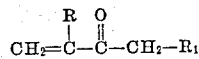

is methyl isopropenyl ketone.

17. The method of claim 12 in which the alkali metal alkoxide is a sodium alkoxide having from 1 to 2 carbon atoms.

18. The method of claim 13 in which the diluent is toluene.

19. The method of claim 13 in which the diluent is diethyl ether.

20. The method of claim 13 in which the diluent is hexane.

21. The method of claim 13 in which the diluent is dioxane.

References Cited in the file of this patent

UNITED STATES PATENTS 2,240,730   Voss et al. _____ May 6, 1941

OTHER REFERENCES

Ellis: The Chemistry of Synthetic Resins, page 551, Reinhold Publishing Corporation, 1935, New York.

UNITED STATES PATENT OFFICE
CERTIFICATE OF CORRECTION

Patent No. 2,978,436            April 4, 1961

John F. Jones

It is hereby certified that error appears in the above numbered patent requiring correction and that the said Letters Patent should read as corrected below.

Column 4, line 32, for "oft he" read -- of the --; column 7, lines 40 to 45, in the formula, after the closing bracket, strike out the subscript "n".

Signed and sealed this 24th day of July 1962.

(SEAL)
Attest:

ERNEST W. SWIDER
Attesting Officer

DAVID L. LADD
Commissioner of Patents